United States Patent [19]

Haendel et al.

[11] Patent Number: 4,599,618
[45] Date of Patent: Jul. 8, 1986

[54] NEAREST RETURN TRACKING IN AN FMCW SYSTEM

[75] Inventors: Richard S. Haendel, Iowa City; John C. Wauer, Cedar Rapids, both of Iowa

[73] Assignee: Rockwell International Corporation, El Segundo, Calif.

[21] Appl. No.: 401,804

[22] Filed: Jul. 26, 1982

[51] Int. Cl.$^4$ ............................................. G01S 13/32
[52] U.S. Cl. ...................................... 343/7.5; 343/14; 343/12 A
[58] Field of Search ......................... 343/7.5, 12 A, 14

[56] References Cited

U.S. PATENT DOCUMENTS

| | | | |
|---|---|---|---|
| 3,698,013 | 10/1972 | Hossmann et al. | 343/7.5 |
| 4,107,679 | 8/1978 | Strauch et al. | 343/7.5 |
| 4,276,549 | 6/1981 | Tomasi | 343/7.5 |
| 4,282,524 | 8/1981 | Eymann et al. | 343/14 |
| 4,291,309 | 9/1981 | Spiller et al. | 343/14 X |
| 4,367,473 | 1/1983 | Marin et al. | 343/7.5 X |
| 4,509,049 | 4/1985 | Haendel et al. | 343/7.5 |

Primary Examiner—T. H. Tubbesing
Assistant Examiner—John B. Sotomayor
Attorney, Agent, or Firm—George A. Montanye; H. Fredrick Hamann

[57] ABSTRACT

An FMCW distance measuring device is disclosed which provides nearest return tracking for increased accuracy. A portion of the transmitted wave in an FMCW altimeter is mixed with a received signal indicating distance to a target to produce a beat frequency between the transmitted wave and the received wave. This beat frequency is input to a frequency discriminator. The discriminator output is controlled so that a predetermined point within the spectrum of the returned signal most nearly represents the nearest return. The frequency discriminator thus allows more accurate tracking of altitude in contrast to those conventional systems which track the average or centroid of the spectral return. The frequency discriminator may be used in two ways. In the first technique the transmitted wave is modulated to maintain a constant beat frequency by adjusting the slope of the modulation. The modulation slope is controlled in response to a signal derived from the frequency discriminator to provide nearest return tracking. The system maintains the beat frequency constant based on that nearest return through control of the modulation slope. Nearest return altitude is inversely proportional to modulation slope. In the second technique, modulation slope is held constant or at least is not directly controlled by the frequency discriminator. The frequency discriminator is used in a phase/frequency locked loop to provide an output signal from the VCO that is locked onto the predetermined point within the spectrum of the returned signal. Nearest return altitude is proportional to the frequency of the VCO output signal.

22 Claims, 6 Drawing Figures

NEAREST RETURN TRACKING IN AN FMCW SYSTEM

BACKGROUND OF THE INVENTION

The present invention relates to distance measuring apparatus and more particularly to FMCW radars and altimeters.

As is well known, there are generally two types of radar distance measuring systems, one known as a pulsed radar and the other as FMCW. In the pulsed radar technique, a series of RF pulses are transmitted towards a desired target and the receiver is operated to detect the return of the transmitted pulses as they are reflected from the target. The time delay between the transmitted and received pulses is proportional to the distance to the target. By accurately controlling the transmission and detection of such pulses, highly accurate information can be obtained with respect to the distance to the target.

In an FMCW distance measuring system, a continuous RF signal is repetitively swept by a frequency modulating signal and the resulting modulated carrier is transmitted toward a target. The FM signal is reflected by the target and returned toward the transmitter for reception. A portion of the transmitted signal is mixed with the reflected signal to produce a beat frequency indicative of the distance from the transmitter to the target. By controllng the modulation of the transmitted signal and by detecting the beat frequency, accurate readings of the distance to a target can be determined. Prior art FMCW systems are described in U.S. Pat. Nos. 4,107,679 and 4,276,549 and in the article entitled "Area Target Response of Triangularly Frequency-Modulated Continuous-Wave Radars", *I.E.E.E. Transactions on Aerospace and Electronics Systems,* Vol. AES-14, No. 2, March 1978.

While each of the above techniques can give an indication of distance to target, each technique has its own limitations. For example, the pulsed radar technique enables easy detection and tracking of the nearest return, thereby providing easy detection of altitude or distance changes when used as an altimeter. The pulsed technique, however, requires high transmitter power and large receiver bandwidth and is normally confined to a specific frequency which enables easy jamming in a hostile environment. In addition, the high power solid-state RF devices which are needed to generate the high power RF pulses are not as readily available as low power devices. Further, at lower altitudes, it is difficult to generate and detect the pulses necessary to make accurate readings. In automatic landing systems, this becomes a problem since accuracy at low altitudes is critical for proper control.

In contrast, the FMCW technique enables distance measuring with a lower power transmitter and narrow bandwidth receiver. Because the signal is continuously modulated or swept in frequency, it is less likely to be affected by jamming techniques. In addition, the cost and complexity is substantially reduced by the ready availability of low power solid-state RF devices. By relying on the beat frequency produced by the mixing of the transmitted and received signal, however, the accuracy of the measurement is reduced. Specifically, the beat frequency produced by FMCW returns is not a single frequency but a spectrum of beat frequencies indicative of many reflections received from a target area and representing different altitudes from that target area. Conventional detection circuits produce readings which are the average of the spectrum of beat frequencies or the centroid of the spectral return of those beat frequencies rather than the nearest return. While this averaging is helpful in automatic landing systems, it does not provide high resolution for ground or terrain avoidance systems where pop-up targets are likely to occur.

In the prior art, a variety of systems have been developed to improve the accuracy of the distance measuring provided by FMCW apparatus. These techniques attempted to improve frequency discrimination and modulation non-linearities in order to more accurately control the beat frequencies. Other techniques attempt to sweep over a range of beat frequencies and selectively filter the frequencies in order to more accurately determine individual frequencies indicating nearest returns. Such attempts, however, have met with limited success since the filter characteristics and sweep time for altitude determination are prohibitive over the desired range of altitudes. As a result, the FMCW technique has been used primarily for automatic landing systems and low altitude measurements, while the pulsed technique has been used at high altitudes or where accurate target distance is required. The only other effective compromise has been to include both a pulsed radar and FMCW radar to obtain the benefits of each during anticipated use.

As can be seen, if the accuracy of an FMCW radar can be improved to detect more nearly the frequency of nearest returns, the usefulness of an FMCW radar in more environments would be greatly enhanced. One such system for improving accuracy is disclosed in co-pending U.S. application No. 330,735 entitled "Radar Altimeter Nearest Return Tracking" by Thomas A. Ubriaco, filed Dec. 14, 1981 and assigned to the same assignee as this assignee. The technique and apparatus disclosed herein is an alternative to that referenced in the aforementioned application. The present invention has therefore been developed to improve the accuracy of an FMCW distance measuring system.

SUMMARY OF THE INVENTION

The present invention relates to an FMCW radar altimeter which enables a more accurate determination of distance based upon nearest return tracking. The system includes a modulated RF carrier signal transmitted towards a target area which in turn reflects the transmitted signal. A portion of that transmitted signal is mixed with the detected reflected signal to produce a beat frequency. The spectrum of beat frequencies produced by the returned signals is detected by a frequency discriminator constructed as a digital phase-frequency detector which provides a binary positive or negative output for frequencies above and below a specifically selected beat frequency respectively. The discriminator output is alternately a positive pulse or a negative pulse depending upon the instantaneous frequency from the spectral return. The output of the discriminator is biased so that a negative pulse from a frequency below the selected beat frequency is a predetermined number of times larger than a corresponding positive pulse from a frequency above the selected beat frequency. The discriminator is adjustably biased to have a zero average output when a fixed percentage of the return spectral amplitude is below the selected beat frequency. The output of the discriminator may be used to control the modulation slope of the RF carrier signal so that the received beat frequency as detected by the discriminator is maintained at a constant value equal to the selected frequency based on the previously-mentioned point in the spectral return which closely approximates the nearest return. Alternatively, the output of the discriminator may control a VCO that supplies a reference frequency to the discriminator in a phase/frequency locked loop arrangement. The frequency of the output signal of the VCO tracks the point in the spectral return which also closely approximates the nearest return.

It is therefore a feature of the present invention to provide an improved and more accurate FMCW distance measuring system.

It is a further feature of the invention to provide an FMCW distance measuring system which more accurately determines nearest distance to a target area.

Yet another feature of the invention is to provide an FMCW altimeter which analyzes the spectral distribution of the beat frequency to detect a point representing the nearest return.

Still another feature of the invention is to provide an FMCW distance measuring system which tracks a predetermined point in the spectral return as the nearest return.

A further feature of the invention is to provide an FMCW distance measuring system which tracks a predetermined point in the spectral return and provides an indication of altitude at the point representing the nearest return.

Another feature of the invention is to provide an FMCW distance measuring system which detects a predetermined point in a spectral return to provide an output which controls the slope of modulation frequency for maintaining a constant beat frequency.

A still further feature of the invention is to provide an FMCW distance measuring system which provides a measure of altitude as a function of the slope of a modulated signal where the slope is based upon a predetermined point in the spectral return representing beat frequency.

These and other advantages and novel features of the invention will become apparent from the following detailed description when considered with the accompanying drawings wherein:

DETAILED DESCRIPTION OF A PREFERRED EMBODIMENT

Figure 1A:
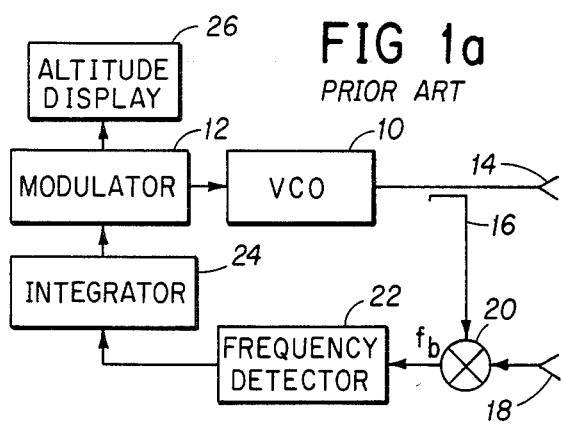
FIG. 1a and 1b are schematic block diagrams showing embodiments of FMCW systems known in the prior art.

Referring now to the drawings, wherein like numerals are used to refer to like elements throughout, FIG. 1a shows a typical FMCW distance measuring system as is commonly known in the prior art. The system generally includes a frequency generator 10 which may be, for example, a voltage controlled oscillator (VCO) that provides a variable high frequency output about a center point frequency in response to a varying input voltage. The varying input voltage can be provided by modulator 12 which is designed to linearly sweep the frequency transmitted by generator 10 about its center point. Modulator 12 may provide a ramp output voltage, the slope of which is controlled in a feedback loop as will be subsequently described. The output of the generator 10 is coupled to transmitting antenna 14 which is positioned to beam the generated signal towards a target. In the present instance, the system will be described with respect to its use as an altimeter system in which the transmitter and the antenna are located in an aircraft above a ground target.

The transmitted high frequency from generator 10 is directed by antenna 14 to the ground or target area and a reflected signal is received by a second antenna 18 and coupled to a mixer 20. A portion of the output of generator 10 is coupled by coupler 16 (which may be a conventional directional coupler) as a second input to the mixer 20. The mixer 20 thereafter provides an output $f_b$ which is known as a difference signal or a beat frequency. In one prior art technique, the modulator 12 is operated to control the slope of the ramp voltage to maintain a constant beat frequency at the output of mixer 20. The beat frequency is coupled to a frequency detector 22 which is in turn coupled to an integrator 24 and thence to modulator 12.

The output of frequency detector 22 is normally an error signal indicating the difference between the detected frequency $f_b$ and a desired beat frequency $F_b$. The integrator 24 receives the error signal and provides an integrated output to the modulator 12 which adjusts the slope of the waveform provided to VCO 10 so that the frequency detected by frequency detector 22 equals the desired beat frequency $F_b$. The altitude is then measured by the specific relationships established between the beat frequency, slope and time period of the modulation waveform. Normally, the distance or altitude is proportional to the period of modulation when the amplitude of the modulating waveform is constant. Thus, an output from modulator 12 representing the period of modulation may be coupled to a display device 26 which calibrates and displays altitude in proportion to the period of modulation from modulator 12. Reference may be made to previously-mentioned U.S. Pat. Nos. 4,107,679 and 4,276,549 and to the I.E.E.E. Transactions article as examples of the above conventional and similar circuits.

In altimeters using the above known FMCW radar techniques, a frequency counter is normally used as the frequency detector 22 to count the beat frequency or frequency difference $f_b$ between the transmitted and received signal. In operation, however, the beat frequency produced by the mixer 20 is not a single frequency. It is a return spectrum of different frequencies corresponding to different distances to objects on the ground. Since the frequency counter responds to all received frequencies within the passband, it counts and detects the average frequency of the return spectrum rather than one specific frequency. Control of the modulation slope and thus the modulation period is then dependent upon an error signal representing the difference between the desired beat frequency $F_b$ and the average of a spectrum of beat frequencies $f_b$, which results in the tracking of the average frequency rather than the nearest return. The above system is therefore incapable of accurately and efficiently responding to pop-up targets and rapid changes in terrain altitude to provide updated altitude readings.

In an attempt to enable the FMCW radar to operate similar to a pulsed radar and provide a good approximation of nearest return tracking, it is known to place a narrow bandwidth filter over the leading edge or lowest frequency of the return spectrum and thereafter count that lowest frequency. Using this count, the beat frequency can be held constant by changing the modulation frequency, thus producing a narrow band, fixed frequency discriminator. In order to insure the narrow bandwidth of the system, and to make certain that the narrrow bandwidth is at the leading edge or nearest return of the spectrum, the system must go into a periodic search mode from a low to high altitude to check the return signals. The search mode takes substantial time and changes in altitude require an extended time for target acquisition, both of which are unacceptable in most applications. Such techniques have therefore not been successful in improving the capabilities of the FMCW radar as an altimeter system.

Figure 1B:
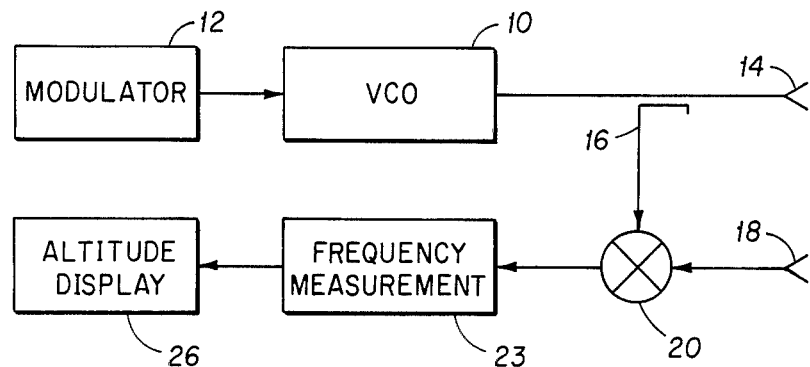

Another prior art FMCW distance measuring system is shown in FIG. 1b. The modulator 12 is not directly controlled by a signal derived from the beat frequency signal which is the output of mixer 20. The beat frequency is directly measured by a device 23 which usually consists of a frequency counter for counting zero crossings for a specified time interval. Since the frequency counter responds to all received frequencies within the passband it only detects average frequency as a representation of distance as was previously discussed.

Figure 2A:
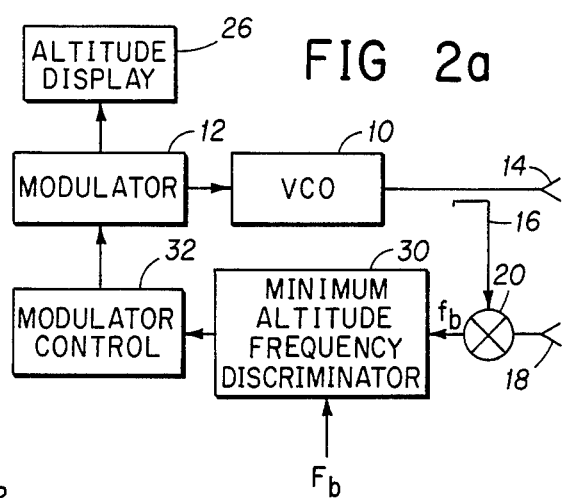
FIG. 2a and 2b are schematic block diagrams of embodiments of FMCW systems employing the detection technique of the present invention.
Figure 2B:
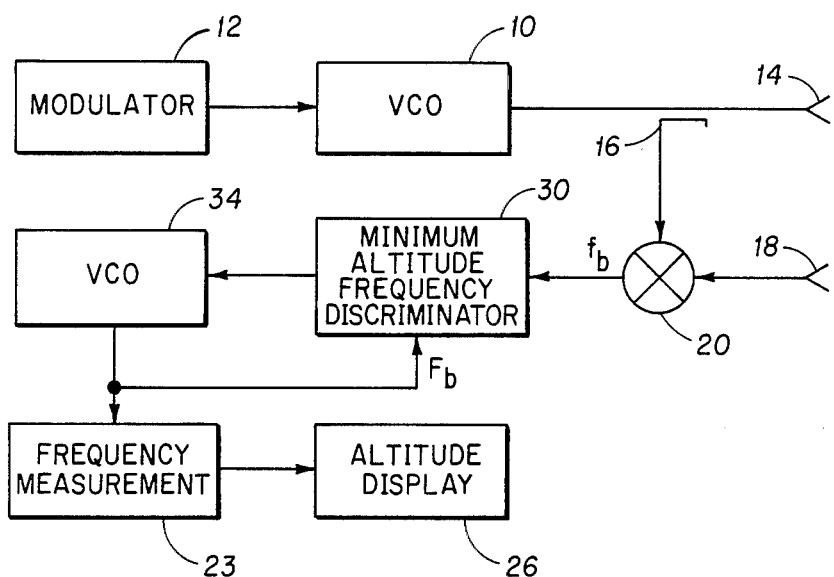

In accordance with the present invention, the above disadvantages have been reduced by the use of the system shown in FIG. 2a or 2b. For the case of FIG. 2a, the modulator 12 controls the frequency generator 10 to transmit high frequency signals from antenna 14 as previously described in FIG. 1a. Again, the coupler 16 provides a portion of that transmitted signal to mixer 20 which also receives reflected signals constituting the return signal spectrum through receiving antenna 18. The difference or beat frequency $f_b$, provided as output from the mixer 20, is then coupled to minimum altitude frequency discriminator 30, the details of which are more particularly shown in FIG. 3. The minimum altitude frequency discriminator 30 compares the received signal spectrum $f_b$ with the reference frequency $F_b$, which is the desired beat frequency, at a point in the signal spectrum which approximates tracking at a frequency representing the nearest return. The tracking is accomplished by providing a variable offset voltage which is compared against a voltage output provided by weighted portions of the return spectrum so that the output signal from the discriminator 30 represents an error signal indicating the difference between the desired beat frequency $F_b$ and the beat frequency produced by the nearest return. This error signal is provided as input to a modulator control circuit 32 which in turn drives the modulator 12 to either increase or decrease the modulation slope so that the detected frequency of the spectral return representing the lowest altitude is constant and equal to the reference $F_b$.

The modulator control 32 may be any of a variety of devices dependent upon the output provided by the minimum altitude frequency discriminator 30. If the output from 30 is provided as an analog error signal, the modulator control 32 may be a conventional integrator as was described with respect to FIG. 1a. In this instance, the error signal provided from 30 would be integrated and provided to modulator 12 to cause modulator 12 to increase or decrease its modulation slope depending on the magnitude of the integrated output from 32. Alternatively, the output from minimum altitude frequency discriminator 30 could be a digital signal provided to a digital counter and D/A converter in modulation control 32. In this instance, the digital error produced by 30 after conversion to an analog signal would then be used to control modulator 12 to cause increases or decreases in the slope of the modulation applied to voltage controlled oscillator 10. Such a digital control is described more particularly in our co-pending application entitled "FMCW System Providing Search-While-Track Function and Altitude Rate Determination", which application is assigned to the same assignee as the present application, filed on even date herewith, and hereby incorporated by reference in its entirety. In either case, the altitude is displayed by a meter or other display 26 which measures the slope of the modulation waveform as an indication of the altitude.

The disadvantages of prior art described in FIG. 1b may also be reduced in accordance with the present invention by use of the system shown in FIG. 2b. The beat frequency signal which is the output of mixer 20 is coupled to the minimum altitude frequency discriminator 30. The minimum altitude discriminator 30 is combined with VCO 34 to form a phase/frequency locked loop. The VCO 34 output signal has frequency $F_b$ which will lock onto a predetermined point within the spectrum $f_b$ of the beat frequency signal. The output signal of VCO 34 has a simple line spectrum and so its frequency can be measured unambiguously by 23 and recalled to be displayed as a representation of altitude.

Figure 3:
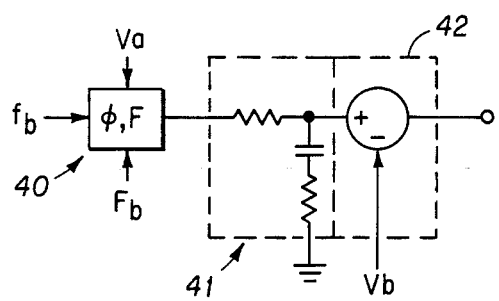
FIG. 3 is a schematic block diagram showing a frequency discriminator used in accordance with the systems of FIG. 2.

Referring now to FIG. 3, there is shown a schematic block diagram of the discriminator circuit. The discriminator 30 includes a conventional digital phase-frequency detector 40 which receives the beat frequency spectrum $f_b$ and the reference frequency or desired beat frequency $F_b$ and provides an output voltage which is a binary positive voltage Va for frequencies above the desired beat frequency $F_b$ or a binary negative voltage Va for frequencies below the desired beat frequency $F_b$. Due to the nature of the received signal as a spectrum of received beat signals, the detector 40 output will be a positive or negative pulse as the instantaneous frequency $f_b$ varies. The output of the detector 40 is then low pass filtered by circuit 41 to extract the average value of the output signal which is coupled as input to a summing circuit 42. The summing circuit 42 receives a voltage Vb at one of its input terminals and is constructed to weight the positive and negative pulses so that a negative pulse from 40 produced by a frequency $f_b$ below the desired beat frequency $F_b$ is a predetermined number of times, N, larger than a corresponding positive pulse from 40 produced by a frequency $f_b$ above the desired beat frequency $F_b$. The output from the summing circuit 42 is then a smoothed waveform created by positive and negative pulses having a positive period N times longer than the negative period for zero average output when frequenc $F_b$ is at a predetermined point within the spectrum of the returned signal which is controlled by the voltage offset Vb.

In on embodiment of the invention using a beat frequency of 32 kHz, the offset voltage was fixed to produce a zero average output from the summing circuit 42 when 5% of the spectral amplitude was below the desired beat frequency $F_b$ and 95% of the spectral amplitude was above the desired beat frequency $F_b$. This corresponds to a point in the received return spectrum where 0.3 percent of the spectral energy is below the frequency $F_b$ and 99.7 percent of the spectral energy is above the frequency $F_b$. The variable weighting referred to above is controlled by adjustment of the voltage Vb applied to the summing circuit 42. The voltage Vb may be adjusted in the summing circuit 42, as more particularly shown in FIG. 4, so that the point (frequency) in the received spectral return representing the difference frequency $f_b$ is an approximation of the nearest return rather than an average of the spectral return or centroid of the spectral returns. Thus, the output from summing circuit 42 will provide a signal which tracks more closely with the nearest return and provides a more accurate altitude indication than previously constructed prior art systems.

The output from 42 can be coupled to the modulator control 32 to drive modulator 12 so that the spectral return as represented by the beat frequency $f_b$ is tracked at a point in the spectrum more closely representing the nearest return. Naturally, the output from summing circuit 42 may be converted to an appropriate analog signal and applied to an integrator forming modulator control 32 for controlling the modulation slope. Alternatively, the modulator 32 may comprise a digitizer and digital servo circuit capable of converting the output from 42 to a digital signal for varying the slope of the waveform from modulator 12.

In analyzing spectral returns from various ground and water targets, it was experimentally determined that if the offset voltage Vb was set to produce tracking at a point where 95% of the return signal spectrum $f_b$ is above the reference beat frequency $F_b$ and 5% of the return signal spectrum $f_b$ is below the reference beat frequency $F_b$, leading edge or nearest return tracking is optimized. This percentage may be changed by variation of the voltage input Vb to the summing circuit to either increase or decrease the sensitivity to leading edge tracking. It should be noted, however, that if the sensitivity of the circuit is increased to reduce the 5% value, stability of the circuit will be lost resulting in the inability of the circuit to follow a specific representation of nearest return. Likewise, if the 95% portion is reduced, greater averaging of the spectral returns will result and the accuracy of the circuit will approach that of prior art centroid tracking. For maximum efficiency, therefore, it has been determined that the 95/5% ratio is the most desirable.

Figure 4:
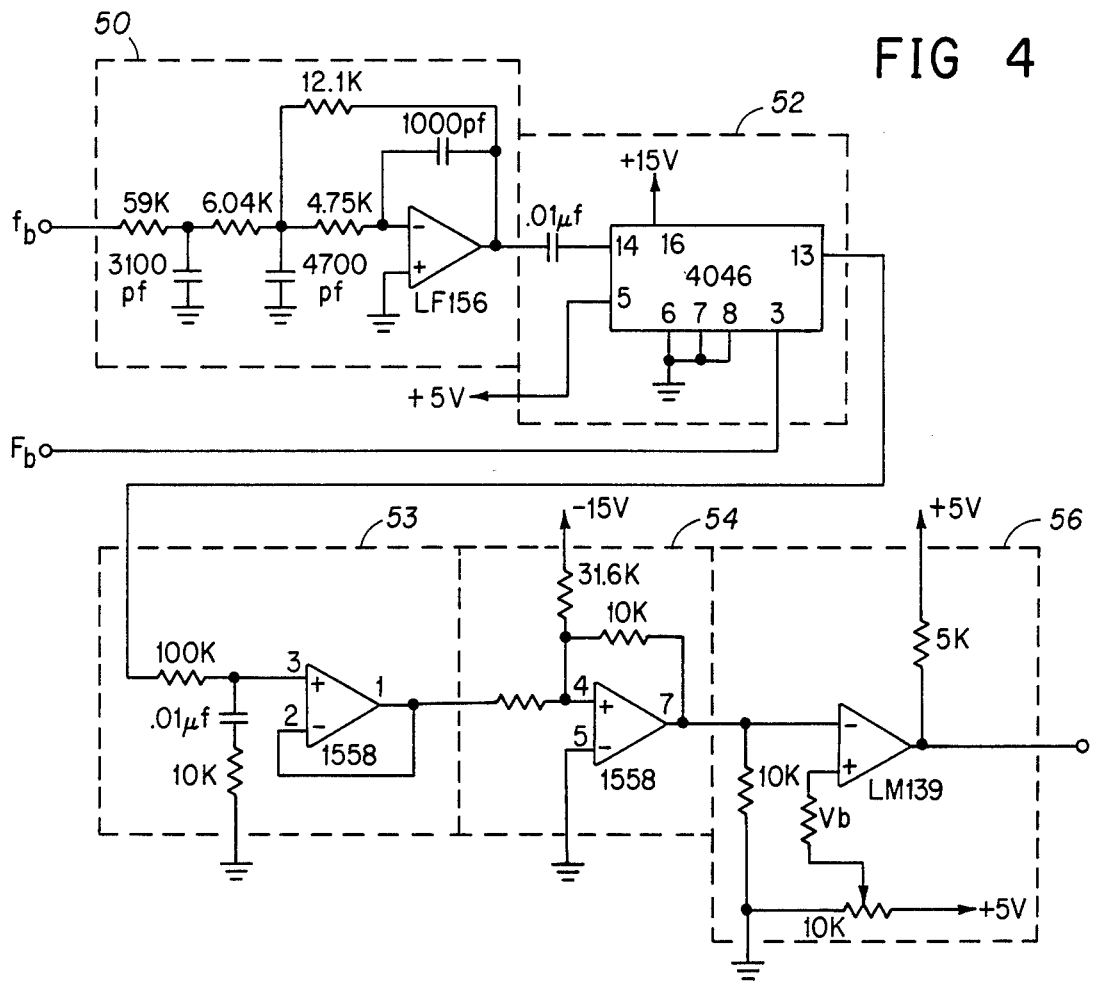
FIG. 4 is a schematic diagram showing a particular circuit which may be used as the frequency discriminator in accordance with the present invention.

Referring next to FIG. 4, there is shown a detailed diagram of the elements which may be used to construct the frequency discriminator 30. In this instance, the components used and their values are as shown in the details of FIG. 4. Generally, however, the circuit includes several elements as depicted by the dotted lines encasing specific groups of components. In particular, the discriminator 30 includes a lowpass filter 50, a frequency detector 52, a low pass filter 53, a level shift 54 and a comparator tracking circuit 56. Each of the circuits cooperate as indicated to receive the return spectrum $f_b$ and the desired beat frequency $F_b$ and to produce an output enabling tracking at a point approximating the nearest return. In particular, the comparator tracking circuit 56 provides the weighting and voltage adjustment so that the voltage Vb produces a signal output that is zero when the frequency $f_b$ most nearly approximates the nearest return. As the frequencies in spectral returns change, the average output from 56 increases or decreases and correspondingly drives the modulator control 32 to increase or decrease the slope of the modulation waveform to produce the zero average output from 56 and thus maintain $f_b$ constant and tracking on the nearest return.

As can be seen from the above description, the present technique provides an improved FMCW distance measuring system which increases accuracy in tracking the nearest return while retaining the benefits of FMCW techniques. The system provides a flexibility for enabling the altimeter system to be used in both autolanding and high altitude environments without complex structures. The low power, narrow bandwidth closed loop tracking using swept frequencies reduces the cost and comlexitpy of many of the system components and allows selectivity in system performance. By being able to adjust the point in the spectral return at which tracking is performed, greater sensitivity and accuracy in determining nearest return for accurate altitude measurement is accomplished. The adjustability of the discriminator to vary the tracking point in the spectral frequency return enables that sensitivity to be increased or decreased depending on the circumstances involved.

While the system has been described with reference to particular elements, it is obvious that other equivalent devices may be used. Obviously, many other modifications and variations of the present invention are possible in light of the above teachings. It is therefore to be understood that within the scope of the appended claims, the invention may be practiced otherwise than as specifically described.

What is claimed is:

1. A distance measuring apparatus comprising:
   means for generating a variable frequency signal;
   means for transmitting said variable frequency signal to a target;
   means for receiving a return spectrum of said variable frequency signal reflected from said target; and
   means for detecting said return spectrum and providing an output at a predetermined point within said spectrum as a representation of the nearest return.

2. The apparatus of claim 1 wherein said means for detecting comprises:
   means for providing a reference frequency; and
   means for providing an output representing the nearest return at a point in said spectral return where predetermined percentages of spectral energy fall above and below said reference frequency respectively.

3. The apparatus of claim 1 further comprising means responsive to said output representing nearest return for providing an altitude display.

4. A distance measuring apparatus comprising:
   means for providing a modulating signal;
   means for responding to said modulating signal for generating a variable frequency signal;
   means for transmitting said variable frequency signal to a target;
   means for receiving a return spectrum of said variable frequency signal reflected from said target;
   means for mixing a portion of said variable frequency signal with said received reflected signal to produce a spectrum of beat frequencies; and
   means responsive to said spectrum of beat frequencies for producing an output representing a nearest return at a predetermined point in said spectrum.

5. The apparatus of claim 4 further including means responsive to said output representing nearest return for controlling said modulator so that said point in the frequency spectrum is equal to a constant beat frequency.

6. The apparatus of claim 4 further including means responsive to said modulating means for providing an output representing target distance as represented by said detected point in said return spectrum.

7. A distance measuring apparatus comprising:
means for providing a linear modulating signal;
means responsive to said linear modulating signal for generating a linearly variable frequency output signal;
means for transmitting said variable frequency output signal to a target;
means for receiving a return spectrum of said variable frequency output signal reflected from said target;
means for mixing a portion of said received reflected signal with said transmitted variable frequency to produce a beat frequency spectrum;
means for detecting a predetermined point within said beat frequency spectrum as the nearest return and providing an output representing said nearest return; and
means responsive to said output for providing a signal indicative of distance to a target.

8. The apparatus of claim 7 wherein said means for detecting includes:
a means for providing a reference frequency; and
means for providing said output at a point in said return spectrum when a predetermined percentage of said detected frequencies fall below said reference frequency and a predetermined portion of said detected frequencies fall above said reference frequency.

9. The apparatus of claim 7 further including means responsive to the modulating means for providing an altitude output reading proportional to the slope of the linear modulating signal.

10. In an FMCW radar distance measuring system having a means for transmitting a signal to a target and a means for receiving and providing a beat frequency output in response to reflected signals from said target, the improvement comprising means for sensing a point in said beat frequency spectrum wherein a predetermined portion of the spectral energy falls above and below said point.

11. The apparatus of claim 10 further comprising means responsive to said selected point for providing a display of altitude represented by said selected point.

12. The apparatus of claim 12 wherein said means for sensing comprises:
a phase frequency detector for providing positive pulse outputs for spectral frequencies above a reference frequency and negative pulse outputs for spectral frequencies below a reference frequency; and
mean for adjustably weighting said pulses and providing an output wherein said output has a zero average value when a predetermined percentage of spectral frequencies fall below said referece frequency and a predetermined percentage of frequencies fall above said predetermined reference frequency.

13. The system of claim 12 further including means responsive to said zero average output means for controlling said modulator means for producing a zero average output from said means for adjustably weighting.

14. A process for providing nearest return tracking in an FMCW radar comprising:
transmitting an FMCW radar signal to a target;
receiving a reflected return spectrum of said FMCW signal from said target;
detecting a predetermined point in said return spectrum which represents nearest return; and
providing an output proportional to said detected point.

15. The process of claim 14 further including the step of displaying said output as a measure of distance to the target.

16. The process of claim 14 further including controlling said transmitted signal to maintain said selected point at a constant frequency.

17. A distance measuring apparatus comprising:
means for generating a variable frequency signal;
means for transmitting said variable frequency signal to a target;
means for receiving a return spectrum of said variable frequency signal reflected from said target; and
means for detecting said return spectrum and providing an output at a predetermined point within said spectrum as a representation of the nearest return, said means for detecting comprising:
means for providing a reference frequency; and
means for providing an output representing the nearest return at a point in said return spectrum where 99.7% of spectral energy in said return spectrum falls above said reference frequency and 0.3% of spectral energy in said return spectrum falls below said reference frequency.

18. A distance measuring apparatus comprising:
means for providing a liner modulating signal;
means responsive to said linear modulating signal for generating a linearly variable frequency output signal;
means for transmitting said variable frequency output signal to a target;
means for receiving a return spectrum of said variable frequency output signal reflected from said target;
means for mixing a portion of said received reflected signal with said transmitted variable frequency to produce a beat frequency spectrum;
means for detecting a predetermined point within said beat frequency spectrum as the nearest return and providing an output representing said nearest return, wherein said means for detecting includes:
means for providing a reference frequency; and
means for providing said output at a point in said return spectrum where 5% of the detected beat frequency amplitude of said beat frequency spectrum falls below said reference frequency and 95% of said detected beat frequency amplitide of said beat frequency spectrum falls above said reference frequency; and
means responsive to said output for providing a signal indicative of distance to a target.

19. In an FMCW radar distance measuring system having a means for transmitting a signal to a target and a means for receiving and providing a beat frequency output in response to reflected signals from said target, the improvement comprising:
means for sensing a point in said beat frequency spectrum wherein 99.7% of spectral energy in said beat frequency output falls above said point and 0.3% of spectral energy in said beat frequency output falls below said point.

20. In an FMCW radar distance measuring system having a means for transmitting a signal to a target and a means for receiving and providing a beat frequency output in response to reflected signals from said target, the improvement comprising:

means for sensing a point in said beat frequency spectrum such that 5% of spectral frequencies of said beat frequency output fall below said point and 95% of spectral frequencies of said beat frequency output fall above said point.

21. A distance measuring system comprising:

means for generating a variable frequency signal;

means for transmitting said variable frequency signal to a target;

means for receiving a return spectrum of said variable frequency signal reflected from said target; and means for detecting said return spectrum and providing an output representing nearest return at a predetermined point within said spectrum wherein 99.7% of spectral energy is above said predetermined point and 0.3% of the spectral energy is below said predetermined point.

22. A distance measuring system comprising:

means for generating a variable frequency signal;

means for transmitting said variable frequency signal to a target;

means for receiving a return spectrum of said variable frequency signal refected from said target; and means for detecting said return spectrum and providing an output representing nearest return at a predetermined point within said spectrum where 5% of spectral frequencies fall below said predetermined point and 95% of the spectral frequencies fall above said predetermined point.

* * * * *